(12) United States Patent
Gupta Hyde et al.

(10) Patent No.: US 12,375,365 B2
(45) Date of Patent: Jul. 29, 2025

(54) CROSS-LAYER AUTOMATED FAULT TRACKING AND ANOMALY DETECTION

(71) Applicant: Intel Corporation, Santa Clara, CA (US)

(72) Inventors: Maruti Gupta Hyde, Portland, OR (US); Yi Zhang, Portland, OR (US); Christian Maciocco, Portland, OR (US); Alexander Bachmutsky, Sunnyvale, CA (US); Satish Chandra Jha, Portland, OR (US); S M Iftekharul Alam, Hillsboro, OR (US); Nageen Himayat, Fremont, CA (US); Ravikumar Balakrishnan, Beaverton, OR (US); Vesh Raj Sharma Banjade, Portland, OR (US); Kshitij Arun Doshi, Tempe, AZ (US); Francesc Guim Bernat, Barcelona (ES); Amar Srivastava, Bangalore (IN); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 17/483,285

(22) Filed: Sep. 23, 2021

(65) Prior Publication Data

US 2022/0014422 A1   Jan. 13, 2022

(51) Int. Cl.
*H04L 41/16* (2022.01)
*H04L 9/40* (2022.01)
(Continued)

(52) U.S. Cl.
CPC .......... *H04L 41/16* (2013.01); *H04L 41/0631* (2013.01); *H04L 41/069* (2013.01);
(Continued)

(58) Field of Classification Search
CPC .............. H04L 41/0631; H04L 41/069; H04L 63/1425; H04W 24/04
(Continued)

(56) References Cited

U.S. PATENT DOCUMENTS

2004/0243349 A1* 12/2004 Greifeneder ........ H04L 63/1408
702/183
2012/0233311 A1* 9/2012 Parker ................... H04L 43/022
709/224
(Continued)

FOREIGN PATENT DOCUMENTS

NL        2032817       9/2023
WO    2021063840       4/2021

OTHER PUBLICATIONS

"Netherlands Application Serial No. 2032817, Office Action mailed Sep. 2, 2022", With English machine translation, 5 pgs.
(Continued)

*Primary Examiner* — David P Zarka
(74) *Attorney, Agent, or Firm* — Schwegman Lundberg & Woessner, P.A.

(57) ABSTRACT

Systems and techniques for cross-layer automated fault tracking and anomaly detection are described herein. Anomaly data may be obtained from a plurality of layers of a network. Elements of the anomaly data may be identified that correspond to a data flow of an application executing on the network. An artificial intelligence model may be trained using the elements of the anomaly data to generate an impact score for the application. The impact score may be generated for the application by evaluating current network metrics using the artificial intelligence model. An operational component of the network may be modified based on the impact score.

24 Claims, 16 Drawing Sheets

(51) Int. Cl.
*H04L 41/0631* (2022.01)
*H04L 41/069* (2022.01)
*H04L 41/147* (2022.01)
*H04L 41/149* (2022.01)
*H04L 41/40* (2022.01)
*H04L 43/08* (2022.01)
*H04L 43/20* (2022.01)
*H04W 24/04* (2009.01)

(52) U.S. Cl.
CPC .............. *H04L 41/40* (2022.05); *H04L 43/08* (2013.01); *H04L 43/20* (2022.05); *H04L 63/1425* (2013.01); *H04W 24/04* (2013.01); *H04L 41/147* (2013.01); *H04L 41/149* (2022.05)

(58) Field of Classification Search
USPC ......................................................... 726/26
See application file for complete search history.

(56) References Cited

U.S. PATENT DOCUMENTS

| | | | |
|---|---|---|---|
| 2020/0120510 A1* | 4/2020 | Gresset | B61L 27/70 |
| 2020/0220791 A1* | 7/2020 | Aiello | G06F 9/455 |
| 2020/0409831 A1* | 12/2020 | Balasubramanian | G06F 11/3476 |
| 2021/0119899 A1* | 4/2021 | Ceyssens | G06F 11/3452 |
| 2021/0204152 A1* | 7/2021 | Vasudevan | H04L 41/147 |

OTHER PUBLICATIONS

"Netherlands Application Serial No. 2032817, Search Report mailed Jul. 6, 2023", W English Translation, 12 pgs.

* cited by examiner

CROSS-LAYER AUTOMATED FAULT TRACKING AND ANOMALY DETECTION

TECHNICAL FIELD

Embodiments described herein generally relate to network reliability and, in some embodiments, more specifically to cross-layer automated fault tracking and anomaly detection in a multi-tiered and multi-edge network.

BACKGROUND

When problems occur at an application layer for, example, a voice call drops, a radio access layer and a network layer may be unaware of the problem as it occurs at the application layer. Given that data sharing is not often viable from the application layer, the network cannot improve the performance if it is not aware that a problem occurred.

Fifth generation technology standard for broadband cellular networks (5G) are complex and error tracking has become more complicated with additional services being added into the network. There is a desire to have a better control and recovery mechanism as compared to long-term evolution (LTE) due to restrictive service level agreement (SLA) requirements, for example, automotive applications may require ~4 ms latency for lane changing use cases.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
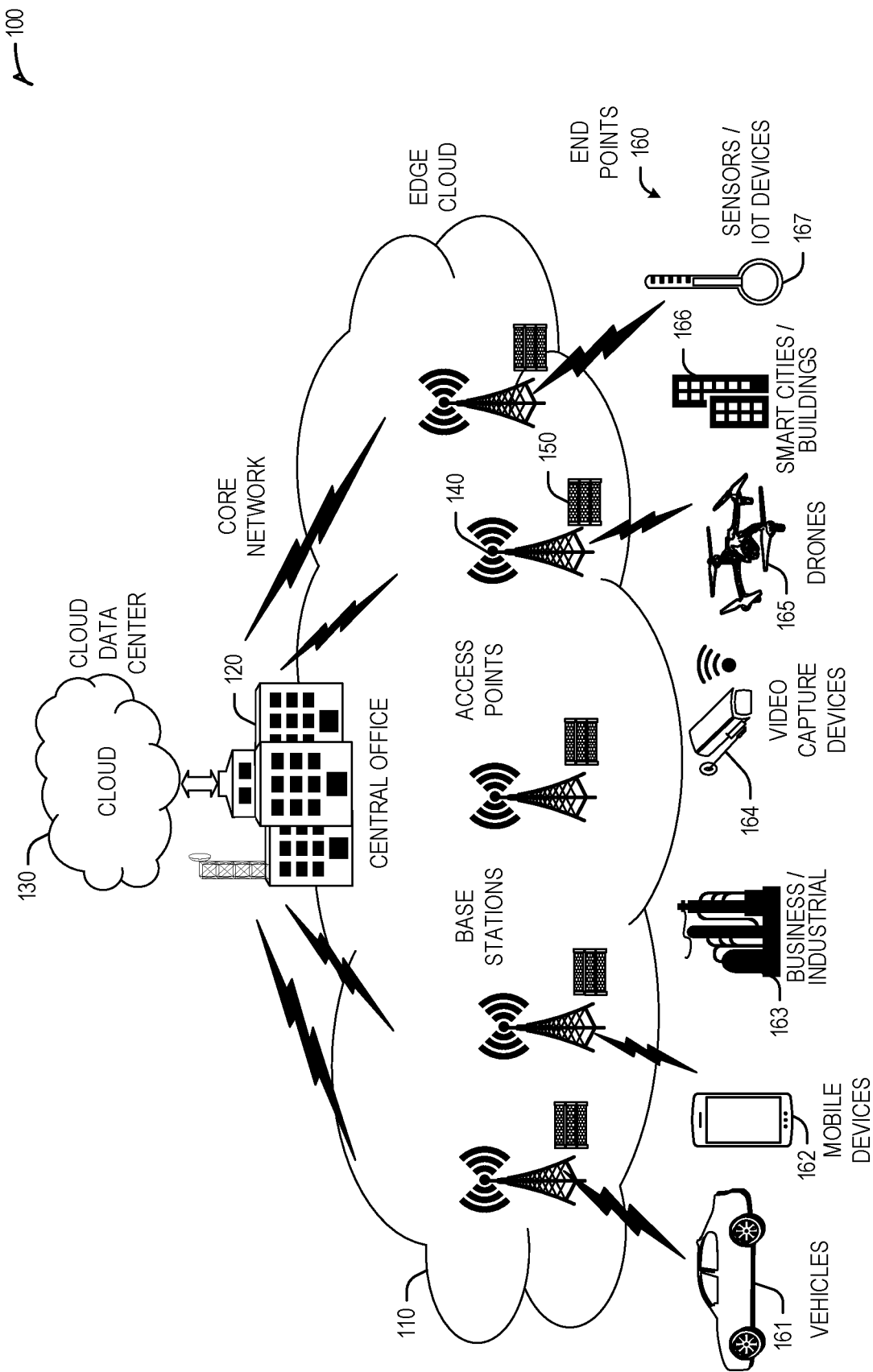
FIG. 1 illustrates an overview of an edge cloud configuration for edge computing.

Conventional application layer debugging leaves debugging to application programmers and the network typically remains application-agnostic and does not track failures unless there is a specific enterprise need for specific failure tracking requirement. In those cases, failure tracking is done by experts that track the problem rather than using any kind of automated tracking system. The existing solutions are sparse and very time consuming requiring considerable expertise. Conventional techniques are also not scalable as networks become bigger and more complex.

Cross-layer work and optimizations have been explored for video over wireless. However, conventional solutions are unable to correlate a network problem at any layer to an application problem. The systems and techniques discussed herein outline a mechanism for gathering indicators from the various networking stack layers such as a transport layer and a network layer as well as a media access control (MAC) layer and a physical (PHY) layer to identify that a problem occurred and use the failure data to correlate it to an application and further determine the cause of the problem. In an example, the network layers may correspond to the layer of the Open Systems Interconnection (OSI) model, the layers of a proprietary protocol stack, an application specific network model, etc.

In an example, a voice call may drop (e.g., is disconnected, etc.) when a user moves from inside a home to outside a home or vice versa. The call may drop because of a change from one access technology (e.g., long-term evolution (LTE)/fifth generation technology standard for broadband cellular networks (5G), etc.) to another access technology (e.g., WI-FI®, etc.). In this case, if the user is using an application such as WHATSAPP®, the radio network cannot know that there was a voice call drop during the switch as the signal strength, etc. remain good and the call drop occurs at the application layer, but this information is not available to the radio network. The cellular and the Wi-Fi network may not have an indication that showed that the Radio Access Technology handover (inter-RAT) was too slow in this case to perform a graceful transition of the application.

Here, the radio network may use information such as Transmission Control Protocol (TCP) connection reset info (e.g., where this information may be applicable) and the fact that another connection for the same application whether TCP/User Datagram Protocol (UDP) had to be reinstated. Furthermore, there may have been a new connection established or that there was an intra-RAT handover (e.g., a handover from one node to another in the same RAT) delay or failure to determine that there was a failure of some kind for the flow. It may use this information to determine the cause of a TCP reset or connection drop at the network layer. For the example mentioned above, it was not due to radio link failure or congestion, but instead due to a switch to another access technology.

When a networking application fails, it is often due to some mishandling/configuration error/system error within one or more layers of the networking stack including the operation system layers at either the client system or at the intermediate points between the two network endpoints. These errors may be tracked using artificial intelligence (AI) engines for detection and diagnosis. The tracking may include tracing the failure through the errors observed, recording a type of previously reported impact on an application, and recording traces left behind at the network layers below the application layer. The errors of a current failure may be correlated with application performance to find the cause so the error may be addressed. An automated system of fault tracking is enabled to correlate errors at various layers that have an impact on application performance and build a classification system of the errors and type of errors observed by the artificial intelligence engines. This may enable generation of an application specific error dashboard rather than a large list of various metrics and key performance indicators (KPIs) as provided by conventional techniques that may be displayed. Unlike the conventional techniques, the dashboard indicates at which layer the problem occurred and provides information to mitigate the problem. This provides clarity into the kinds of issues the network may be facing and a mechanism to improve application performance.

The cross-layer fault tolerance system interfaces with a distributed anomaly detection system that develops AI based models to predict anomalies in the network. Such anomalies may happen at the physical layer (e.g., anomalous signal variation or outage in a given location, etc.), at the MAC layer (e.g., prediction of handover failures, congestion prediction, etc.), application layer anomalies such as dropped calls, poor quality of experience (QoE), etc. The activations or confidence levels of the anomaly detectors are fed into an AI based correlation engine (e.g., a graph-based model, etc.) that localize a set of anomalies that are correlated as well as identify which anomalies are coupled together.

In conventional application error tracking techniques, the networking layers are disparate and while various diagnostics are collected, the diagnostics are often not fully or only partially correlated with application performance. The 5G system is very complex and continues to increase in complexity to support a diverse set of services. The systems and techniques discussed herein enable fault monitoring in an automated way increasing network reliability and performance for a networking solutions provider.

Traversing the network layer stack, the various flows are combined, compressed, and manipulated at different layers such that it is hard to distinguish which bits belong to which application. To get a complete picture, it is useful to get an overall view from each layer of the stack. Thus, a monitoring element of the system works on each plane of different entities in the networking infrastructure starting from the client with the gateways/switches/integrated network processing units (IPUs) in the middle.

At the use equipment (UE)/client side, each application is distinguished by its various data service flows and then at each layer of the networking stack, information is collected that is related to the errors/drops/anomalies that occurred at the respective layer. This information is correlated with and associated with the application based on flow mapping that occurs at different networking layers. An application-error correlation framework enables the correlation of the collected data across the networking stack to specific applications and their specific performance failures. If there is not specific performance failure, the failure is narrowed to a category of failures. For example, a voice call drop due to network congestion is a different kind of failure compared to a voice call with many frequent pauses and interruptions.

On the network side, the failure is tracked by using a trace behind each layer and may have a traffic classification scheme based on application packet size, interarrival times, etc. to form finer application categories within a specific quality of service (QoS) flow such as low-latency, delay-tolerant, mission critical, etc. The information may be collected by an agent executing on equipment that performs, networking functions, nodes that monitor networking functions, etc. or may be collected by a central data collector (e.g., using native reporting functions of network equipment, using taps on network interconnections, etc.), etc.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
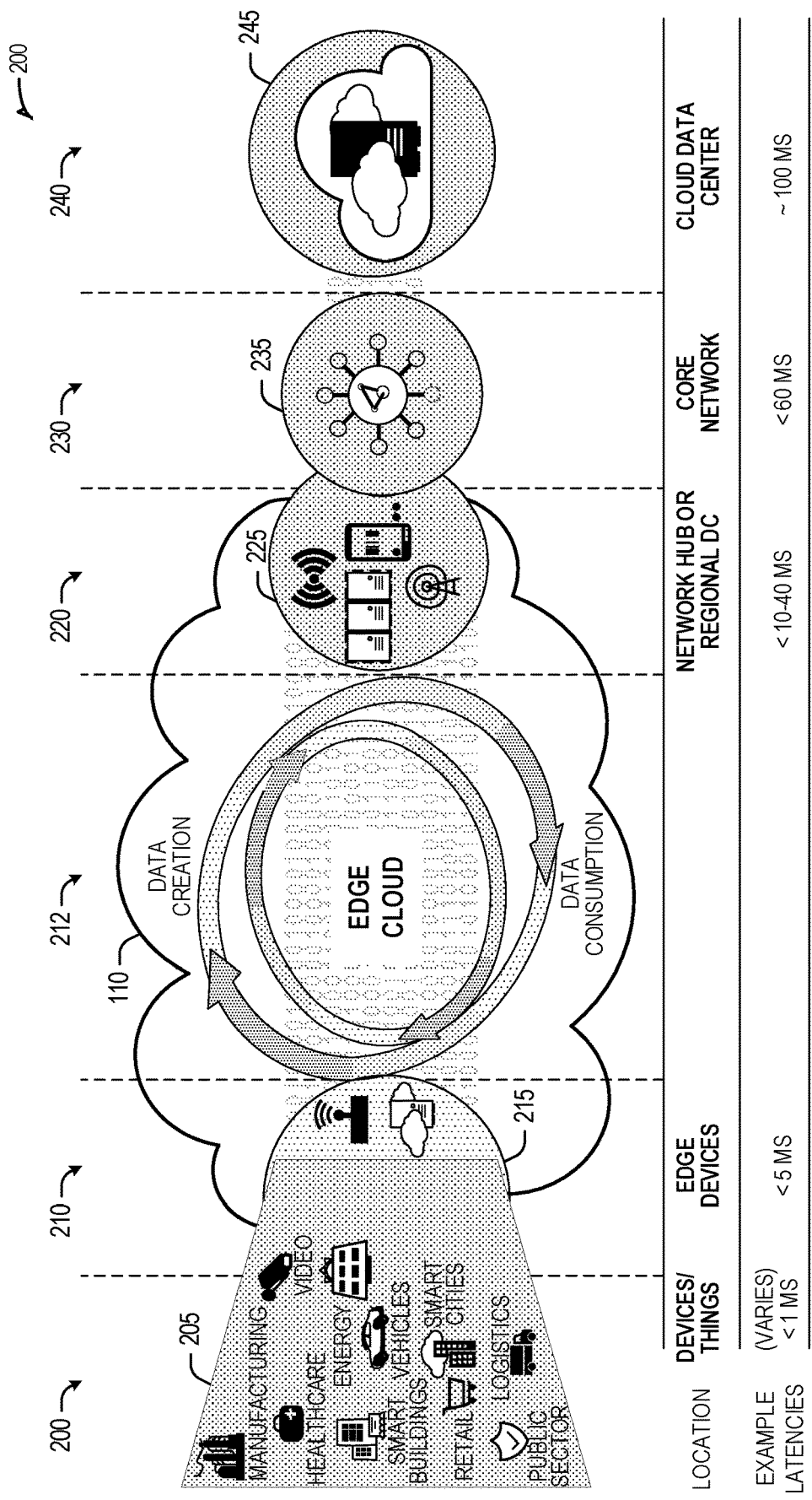
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
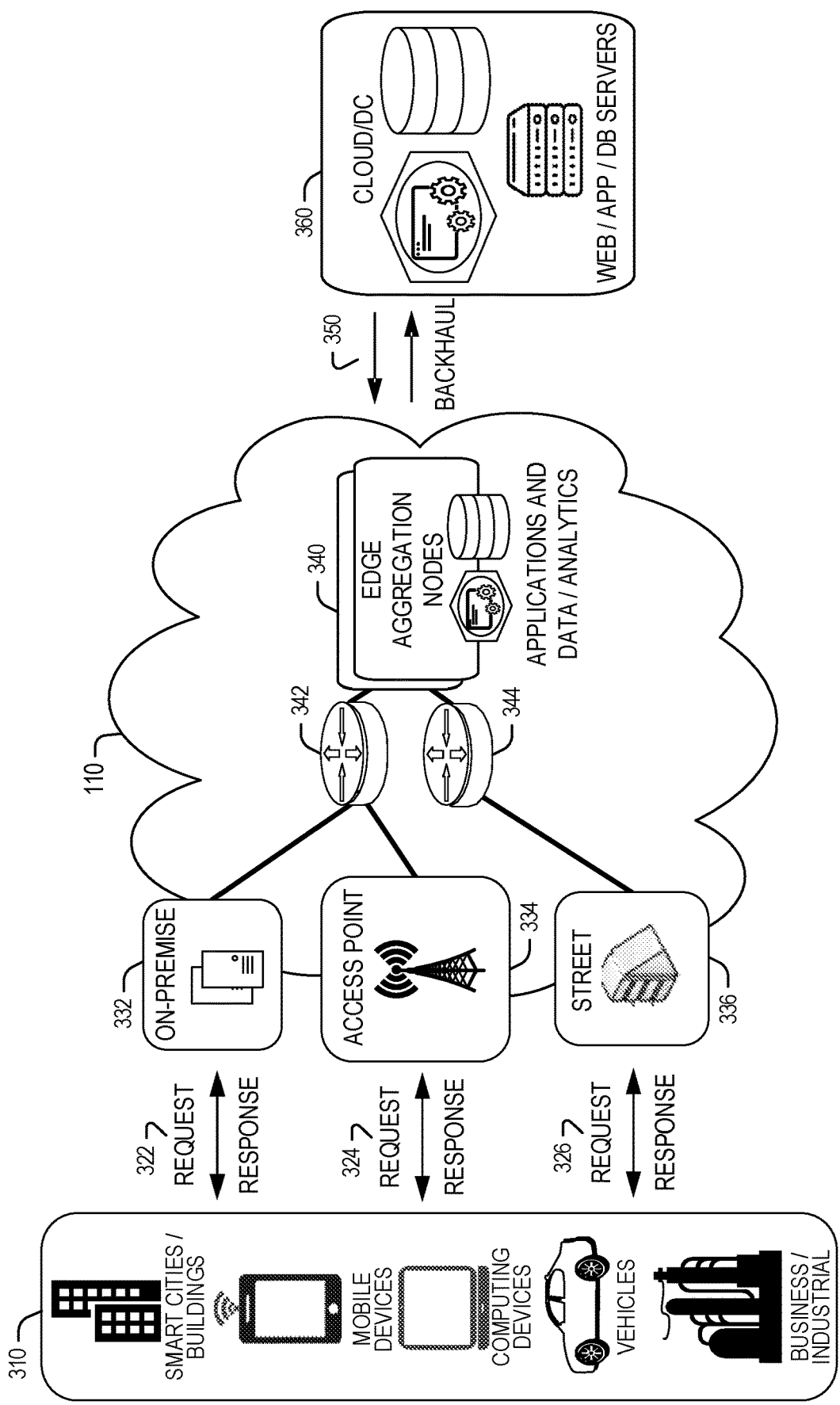
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
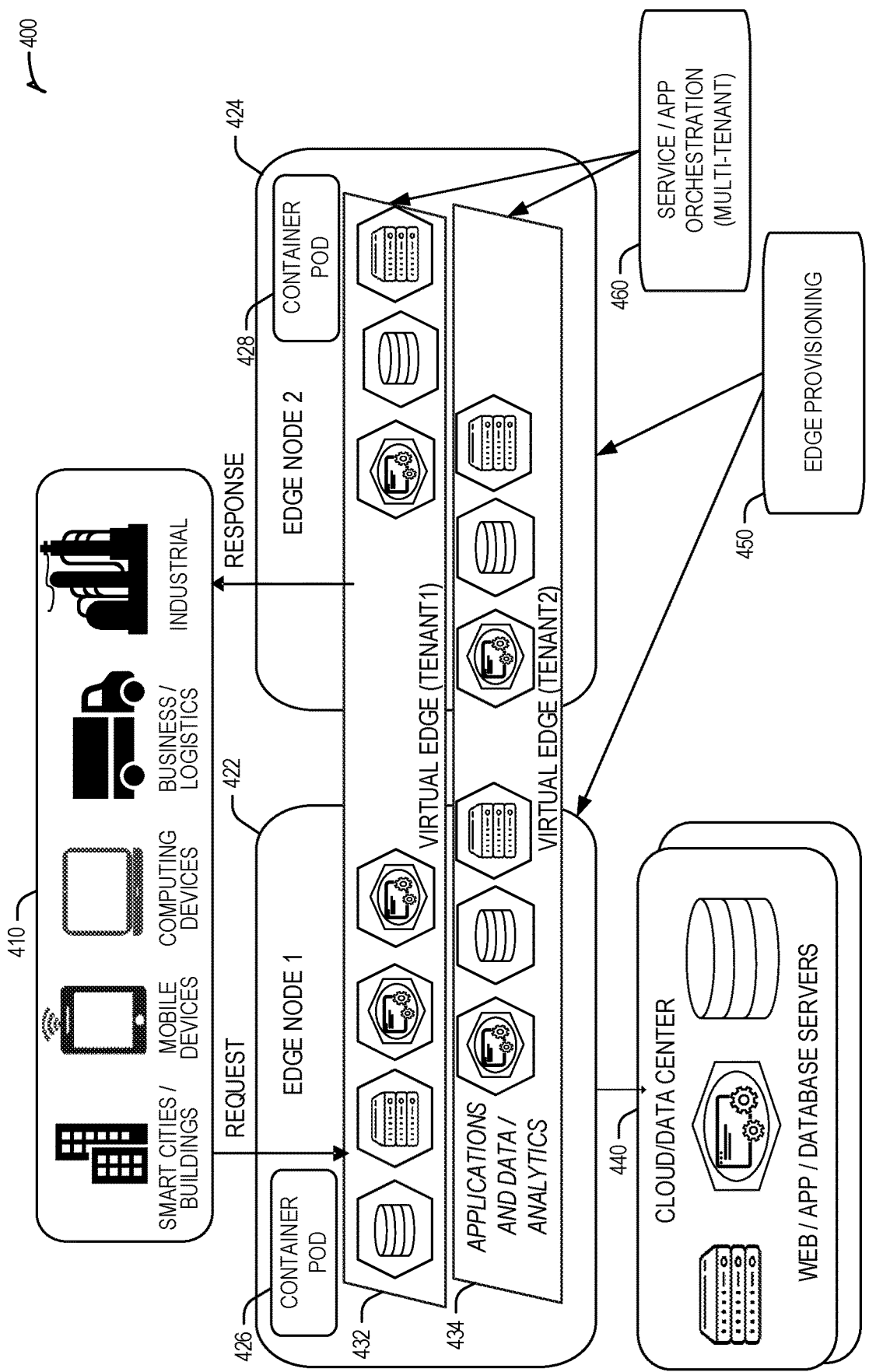
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
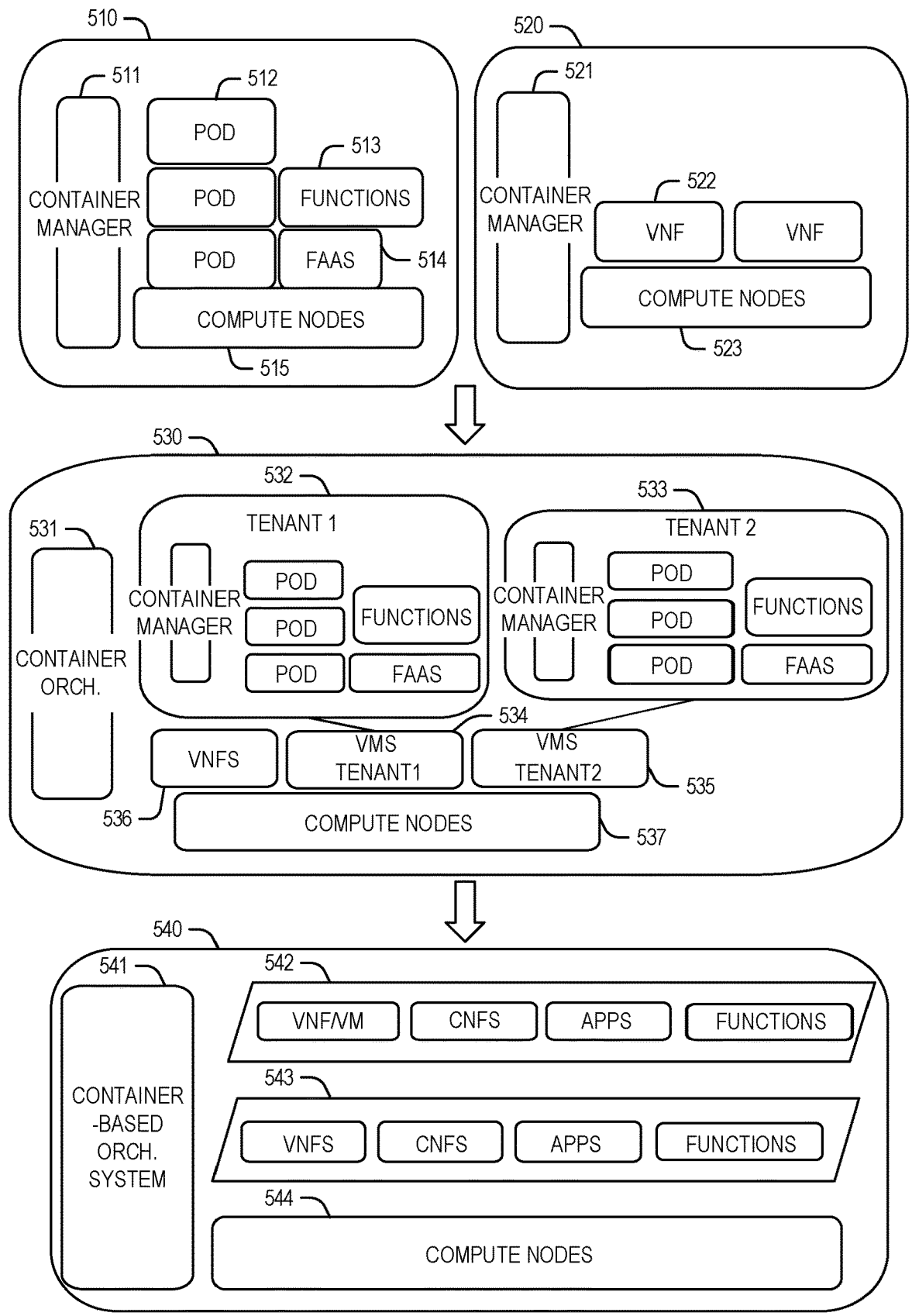
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
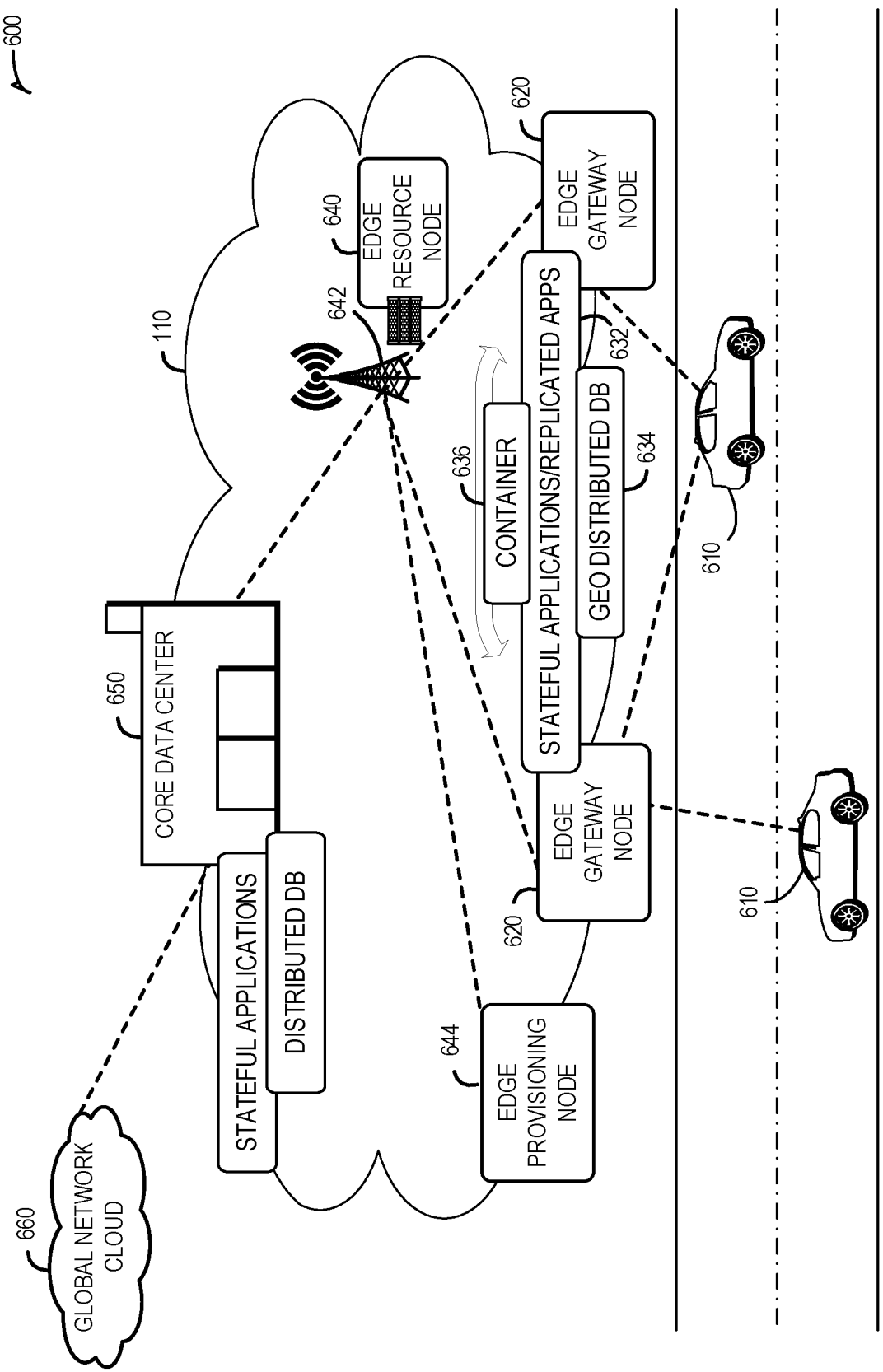
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
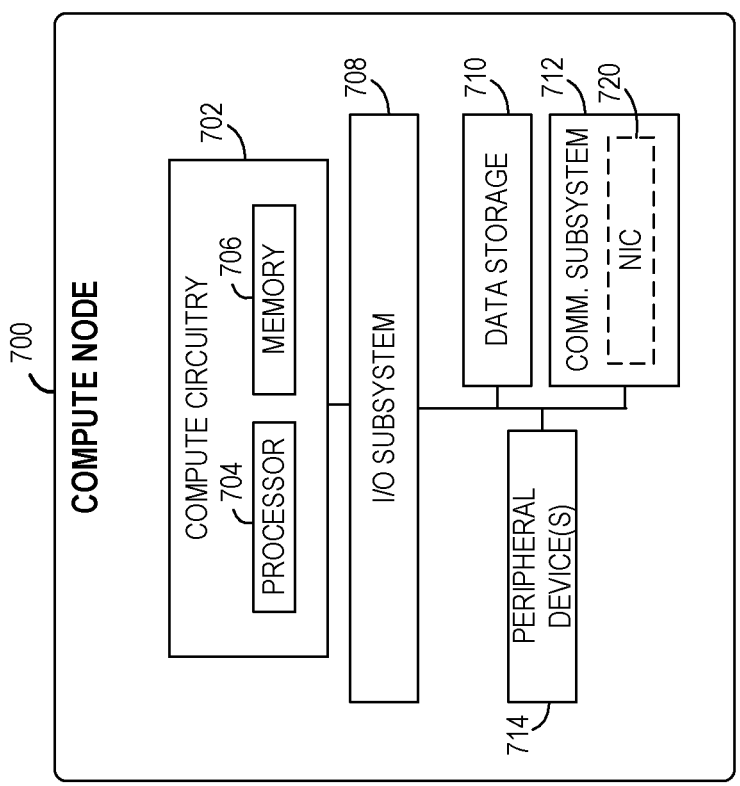
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700.

In further examples, the compute node 700 may be embodied by a respective edge compute node (whether a client, gateway, or aggregation node) in an edge computing system or like forms of appliances, computers, subsystems, circuitry, or other components.

Figure 7B:
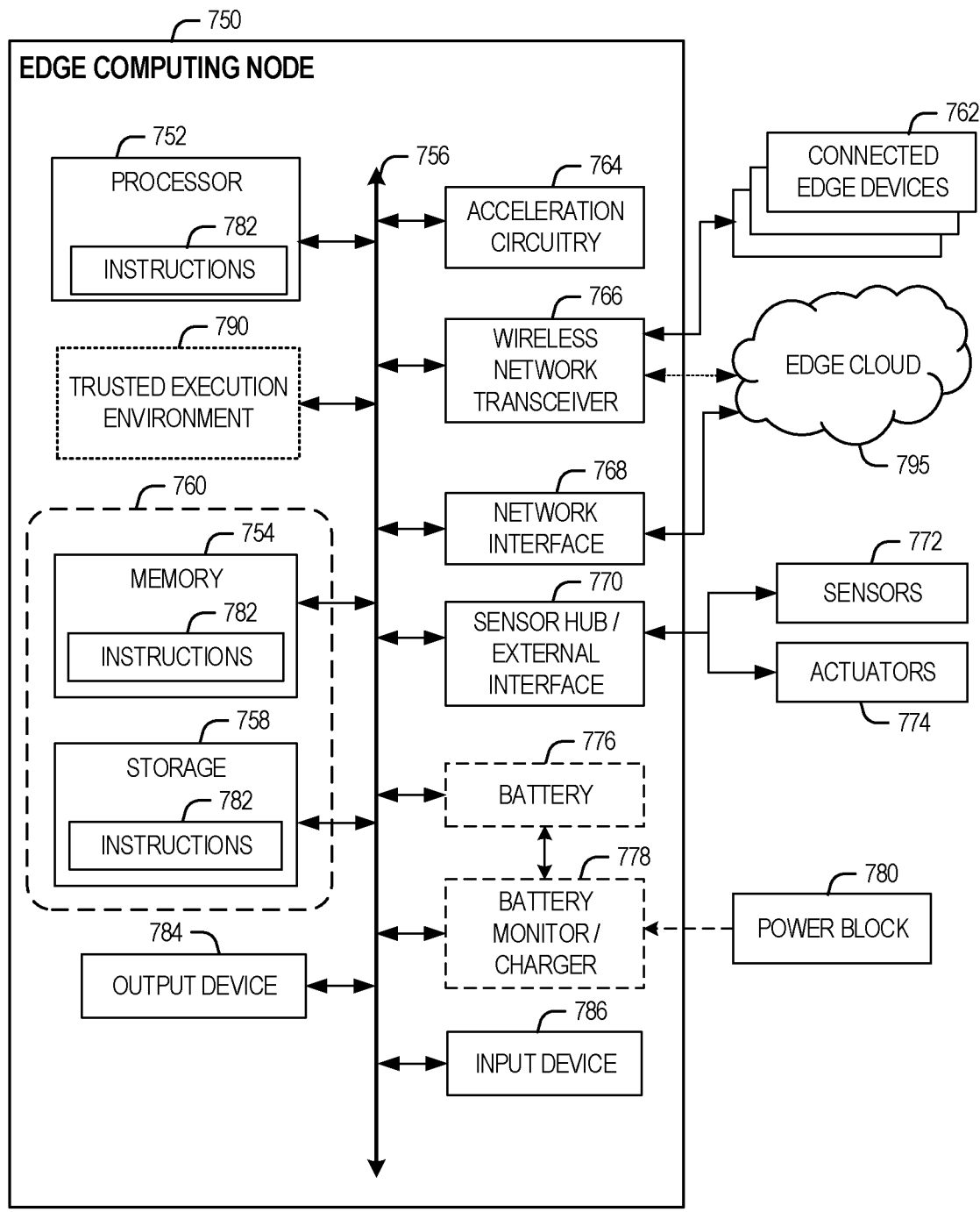
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies.

Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
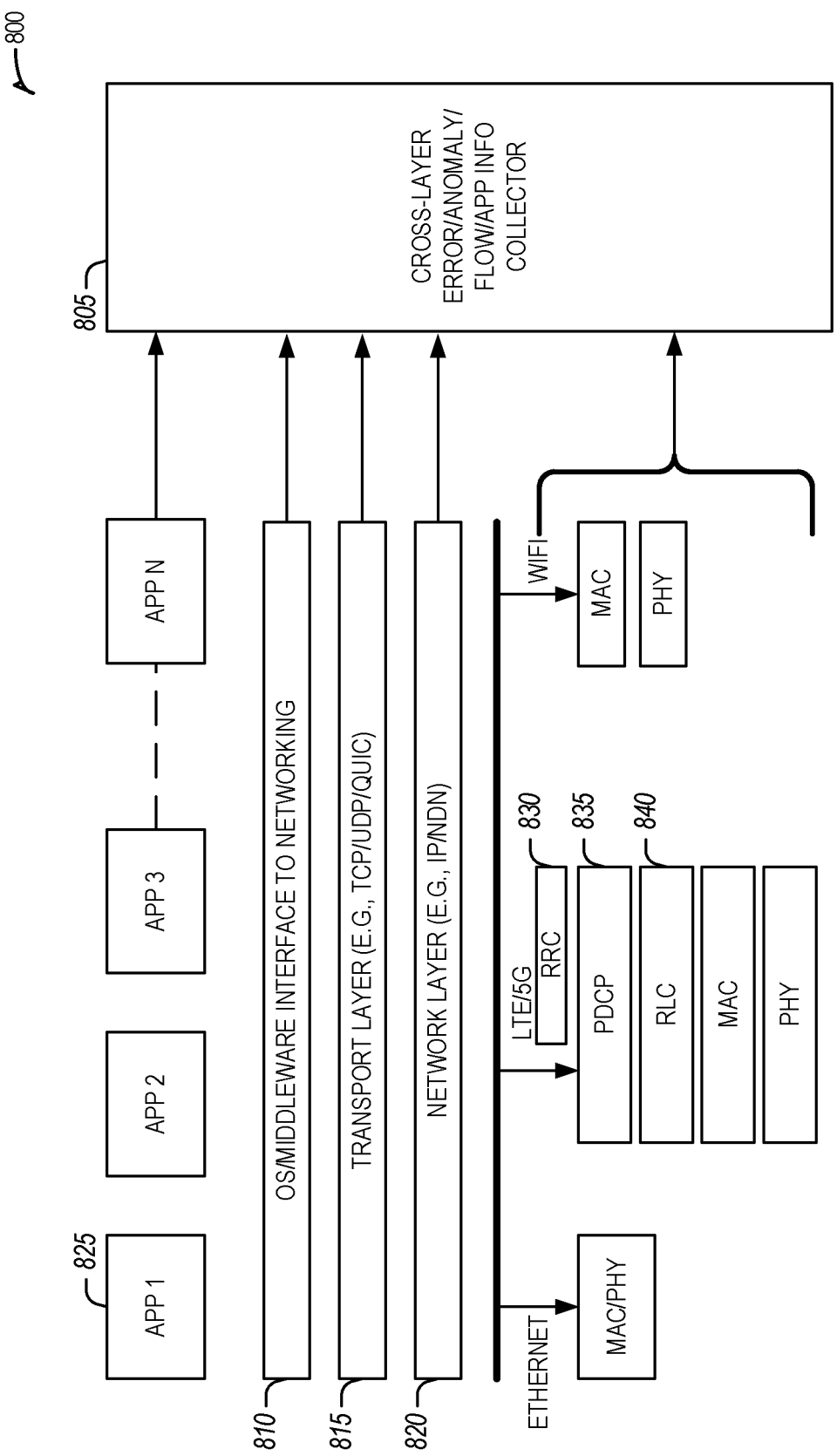
FIG. 8 is a block diagram of an example of a system for collecting information from a client platform for cross-layer automated fault tracking and anomaly detection, according to an embodiment.

FIG. 8 is a block diagram of an example of a system 800 for collecting information from a client platform for cross-layer automated fault tracking and anomaly detection, according to an embodiment.

As shown in FIG. 8, data is gathered by data collector 805 from various layers of the stack including a transport layer 815 and a network layer 820 as well as the operating system 810 on which processes originate the flows so the applications can be linked to their networking traffic. An application 825 may have multiple flows open at any given time and they should be tracked. Various interfaces exist for information to be extracted for diagnostic reasons. For example, there is an existing mechanism which may be extended to communicate error and other messages. A Radio Interface Layer (ML) in a host system of ANDROID™ devices communicates to customized cellular modem protocol layers to obtain the information. Similar interfaces also exist for WI-FI® modems as well. A cellular modem communicates with the base station over the RRC layer 830 which further rests upon other layers as well (packet data convergence protocol (PDCP) 835, radio link control (RLC) 840, etc.) for communicating messages (e.g., error, management of the cellular connection etc.). At each of these protocol layers, error messages can be obtained by using the debug port of the specific modem implementation which generates an exhaustive log of all the activity that occurs at each layer.

Figure 9:
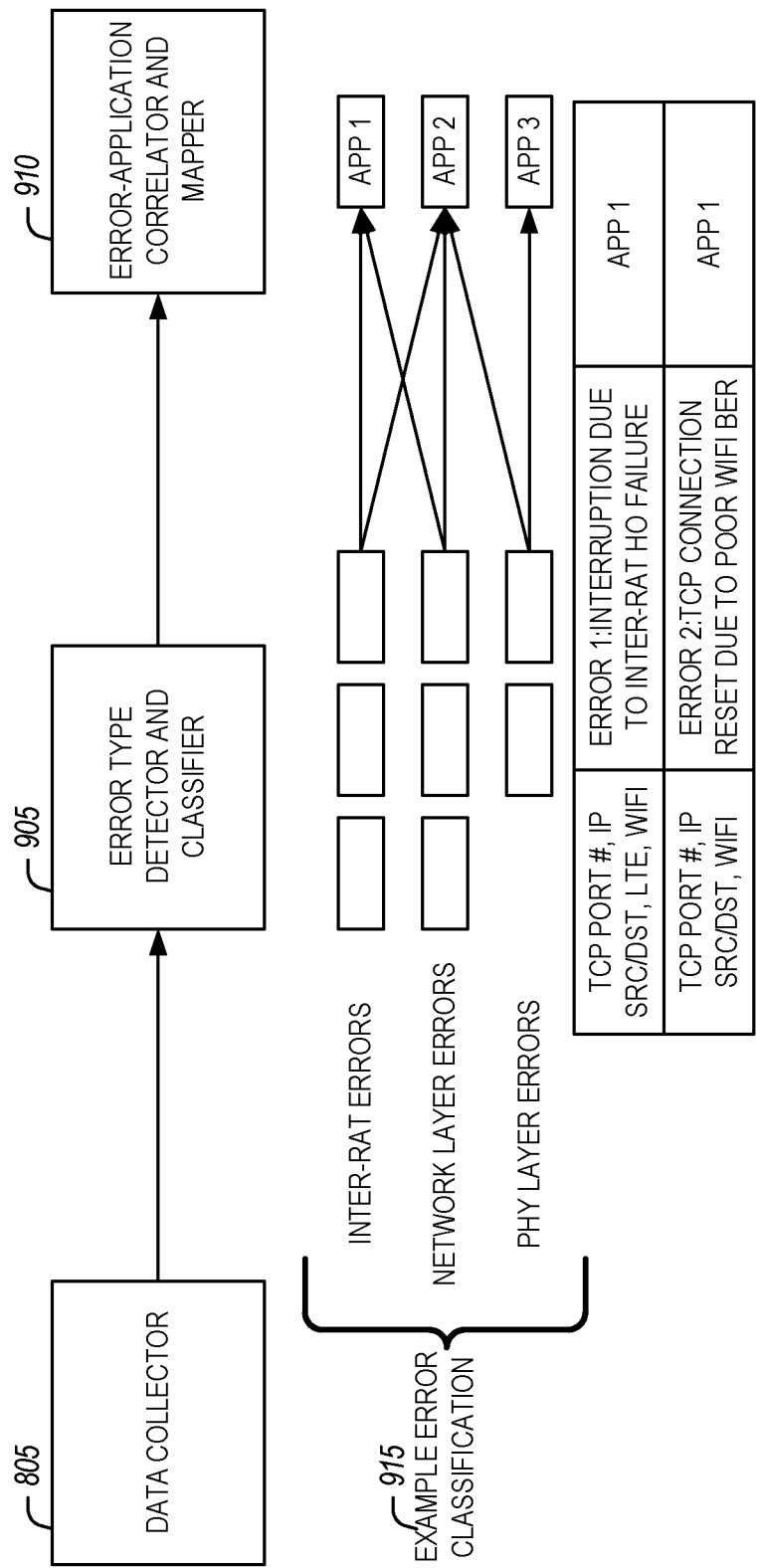
FIG. 9 illustrates a flow diagram of an example of flow of control from the system to the correlation and mapping between errors and applications for cross-layer automated fault tracking and anomaly detection, according to an embodiment.

The data collector 805 interfaces with an error type and detection classifier (as shown in FIG. 9) where various messages from the different layers are interpreted into errors that may be better understood at a higher layer such as inter-RAT handover (HO) failure, lost connections at a TCP layer, etc. Errors from one layer may cascade onto other layers. For example, poor wireless channel quality may lead to such high packet losses that the higher layers start to fail ultimately causing the application 825 to fail entirely or disrupt it severely.

FIG. 9 illustrates a flow diagram 900 of an example of flow of control from the system to the correlation and mapping between errors and applications for cross-layer automated fault tracking and anomaly detection, according to an embodiment.

Errors are classified by an error type and detection classifier 905. The errors are mapped to applications impacted by the errors by an error-application correlator and mapper 910. A single lower layer error may affect multiple applications as shown in an example error classification 915. The example error classification 915 shows various errors could map to the same application at different times. The classification of errors and the mapping and correlation may be performed by separate AI engines that may be part of a centralized or a distributed framework or could be performed by a multi-purpose AI engine that may classify errors and map them to applications.

The components of the flow diagram 900 may be deployed at various points along the network, such as within routers/switches, intermediate nodes of the network such as a base station, withing core network entities, etc. At a core network entity, the task of correlation of the network layer information with applications may rely on flow-level information as the end layer information may not be available. In that case, traffic classification engines may be used in conjunction with the error-application correlator and mapper 910 to map the errors to application categories.

Figure 10:
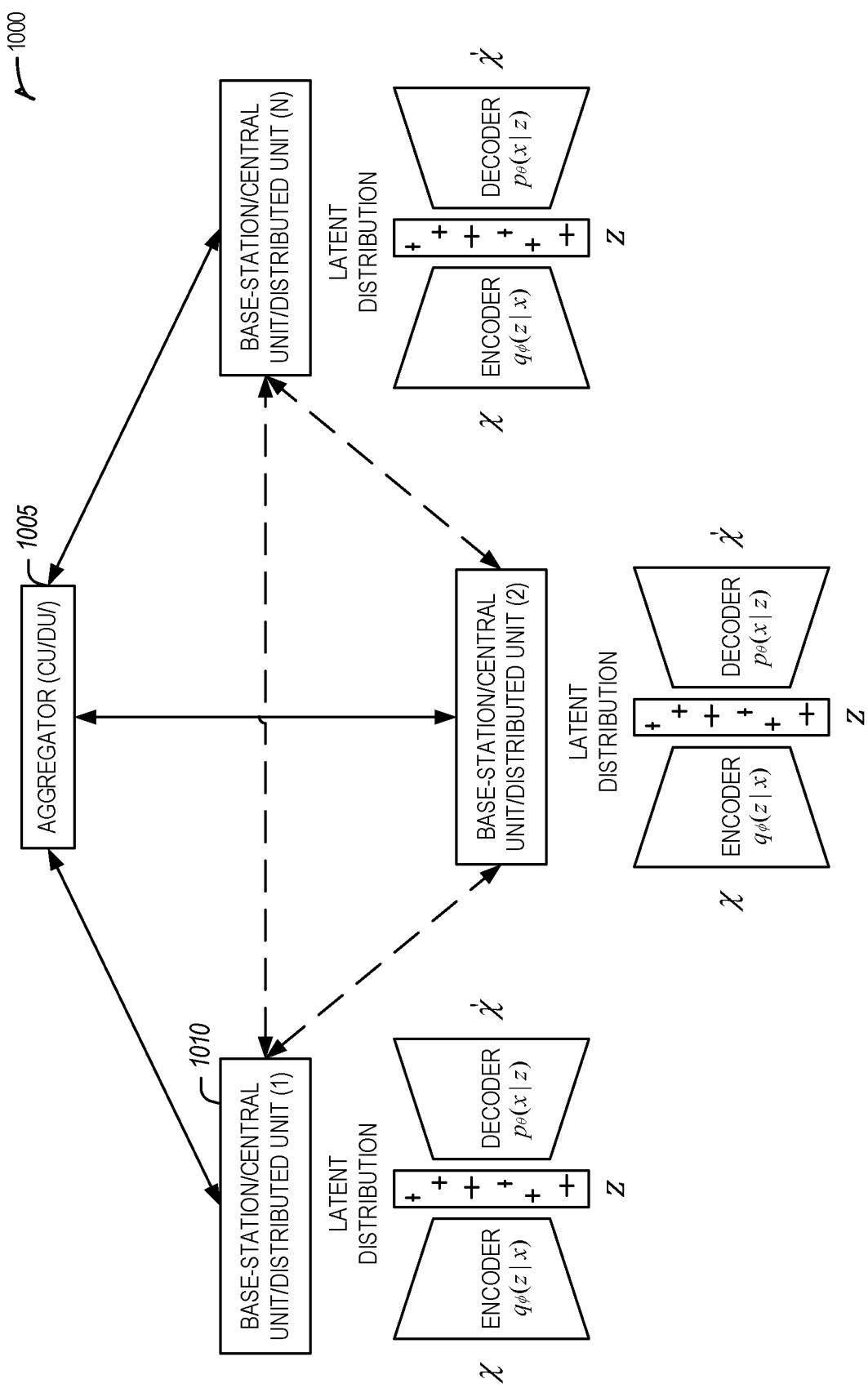
FIG. 10 illustrates an example of an anomaly detection artificial intelligence engine for cross-layer automated fault tracking and anomaly detection, according to an embodiment.

FIG. 10 illustrates an example of an anomaly detection artificial intelligence engine 1000 for cross-layer automated fault tracking and anomaly detection, according to an embodiment.

A data collector (e.g., the data collector 805 as described in FIG. 8, etc.) may be interfaced with the anomaly detection artificial intelligence engine 1000. The anomaly detection artificial intelligence engine 1000 may detect anomalies at different layers of the protocol stack. An aggregator 1005 of a central unit (CU) or a distributed unit (DU) may aggregate data collected and evaluated at base stations/CUs/DUs 1010. The aggregator 1005 may receive the data directly from the base stations/CUs/DUs 1010 or may receive the data from another base station/CU/DU through the base stations/CUs/DUs 1010. Thus, there may be multiple redundant paths for data delivery to ensure information is delivery.

Figure 11:
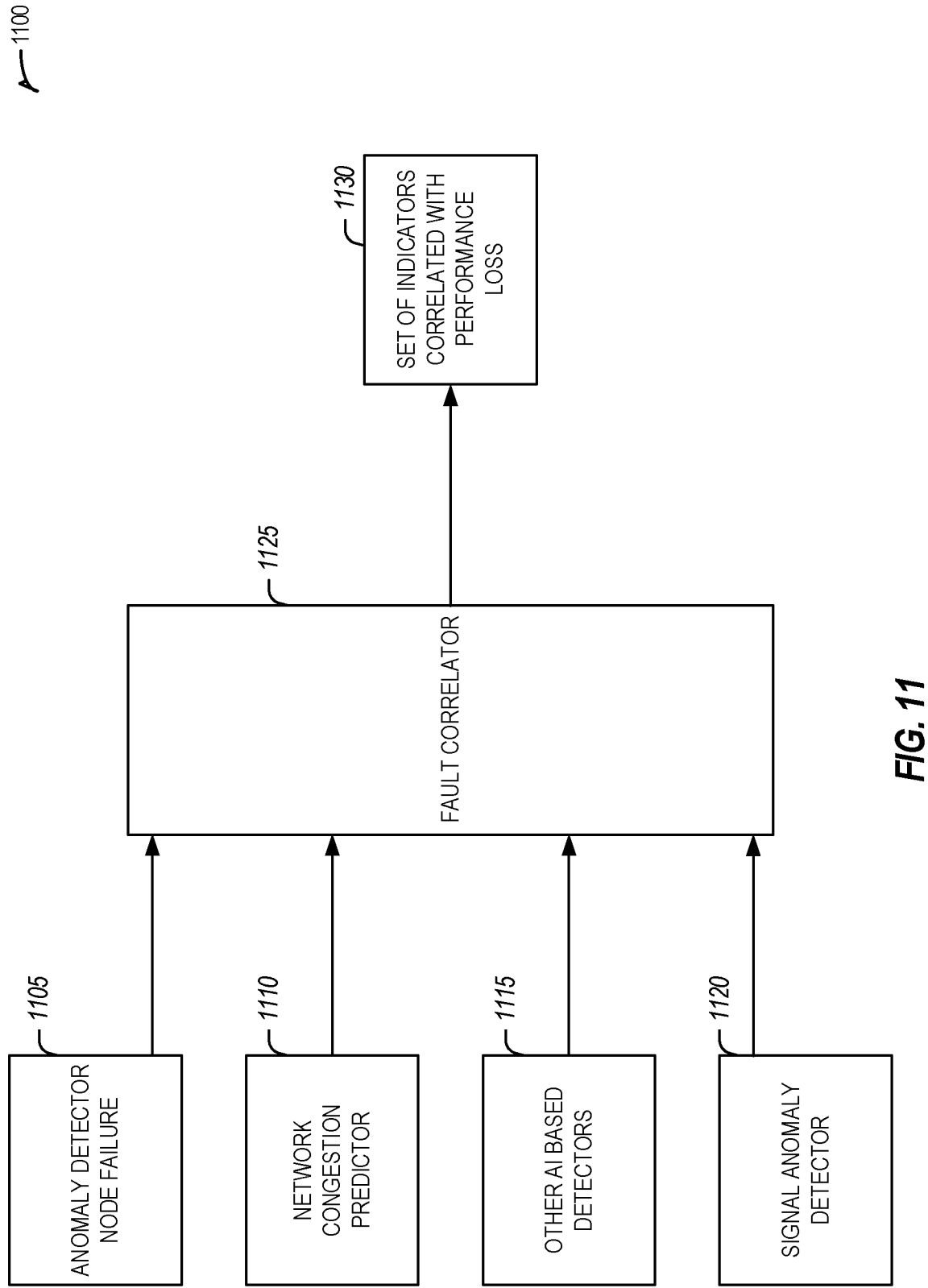
FIG. 11 illustrates an example of a fault monitoring system for cross-layer automated fault tracking and anomaly detection, according to an embodiment.

FIG. 11 illustrates an example of a fault monitoring system 1100 for cross-layer automated fault tracking and anomaly detection, according to an embodiment. The fault monitoring system 1100 may include an anomaly detector 1105, a network congestion predictor 1110, other AI based detectors 1115, signal anomaly detector 1120, and a fault correlator 1125. The anomaly detector 1105, the network congestion predictor 1110, the other AI based detectors 1115, and the signal anomaly detector 1120 may be circuitry or software components that may detect and predict faults and may provide data for the detected and/or predicted faults to the fault correlator 1125. The anomaly detector 1105 may provide anomaly data for the network layers to the fault correlator 1125. The network congestion predictor 1110 may provide information regarding predicted network congestion to the fault correlator 1125. The other AI based detectors 1115 may provide additional information to the fault correlator 1125 that may include information for specialized network components, protocols, proprietary information, etc. The signal anomaly detector 1120 may provide signaling anomaly information to the fault correlator 1125.

The fault correlator 1125 may evaluate the information received from the anomaly detector 1105, the network congestion predictor 1110, the other AI based detectors 1115, and the signal anomaly detector 1120 to generate a set of indicators correlated with performance loss of applications 1130. The set of indicators correlated with performance loss of applications 1130 may be used to build AI models that may be used to evaluate current network condition information for various layers of the network to predict application impacts of the current network conditions at the various layers of the network. For example, increased latency may be present for a network component and an evaluation of the latency data with an AI model may predict that a lane-changing application of a vehicle will be impacted. The application or another controller may alter operations based on the evaluation. For example, the lane-changing application may be temporarily disabled or the network path between the application and the lane-changing network content may be altered to decrease latency.

Figure 12:
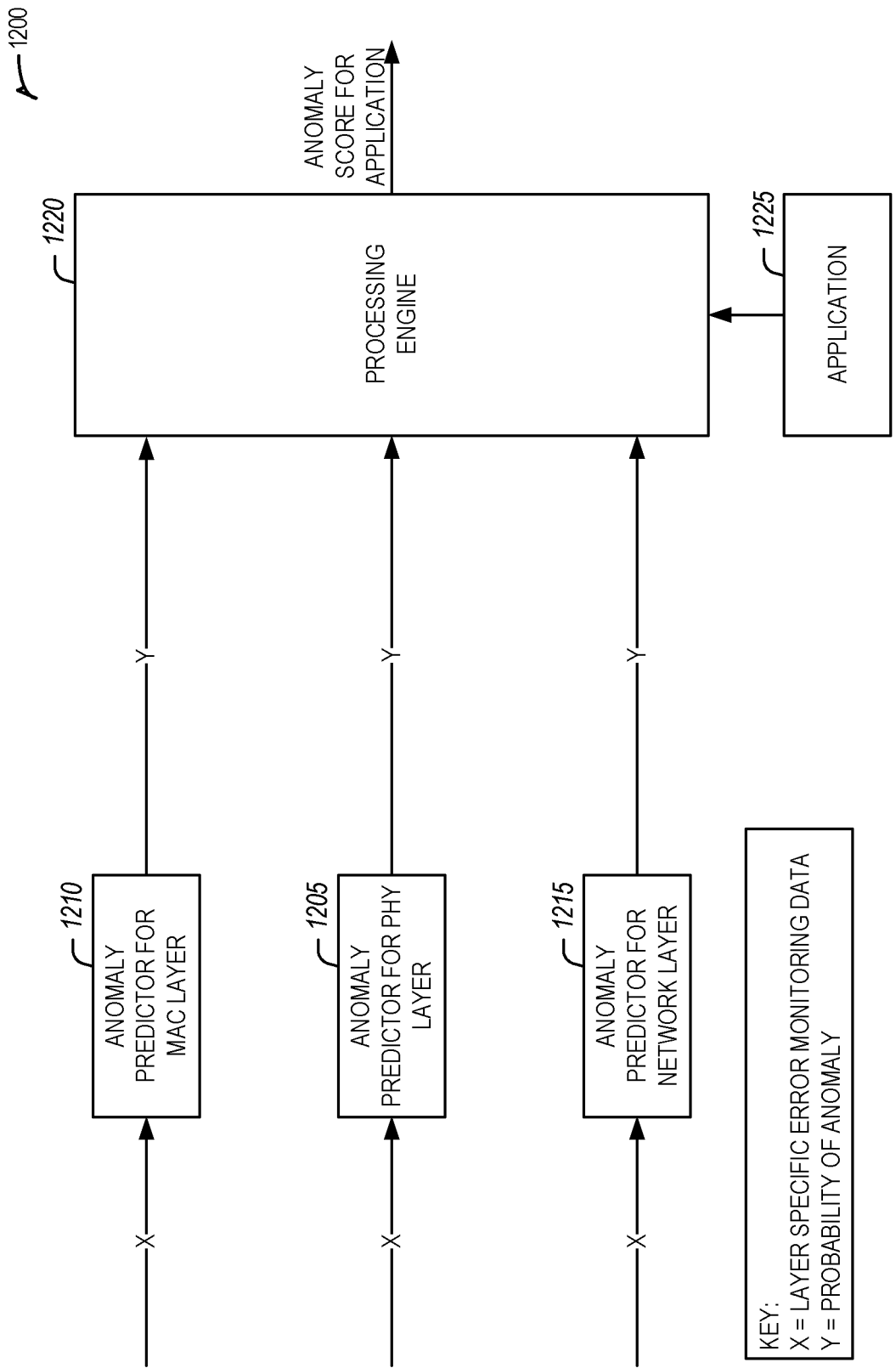
FIG. 12 illustrates an example of a system for generating a score for an application based on anomaly predictions from multiple lower layers for cross-layer automated fault tracking and anomaly detection, according to an embodiment.

FIG. 12 illustrates an example of a system 1200 for generating a score for an application based on anomaly predictions from multiple lower layers for cross-layer automated fault tracking and anomaly detection, according to an embodiment.

An expected QoS may be determined for an application 1225 based on indicators from several lower layers. For example, each layer in a networking stack may present to an application 1225 layer the probability of encountering an anomaly (e.g., a score for the application, etc.) from the perspective of the layer. A PHY layer 1205 may use signal-to-noise ratio (SNR) telemetry, etc. A MAC layer 1210 may observe packet drops and other telemetry, a network layer 1215 may track routing errors, etc. A processing engine 1220 receives anomaly predictions from the multiple lower layers (e.g., the PHY layer 1205, the MAC layer 1210, the network layer 1215, etc.) and generates and assigns an overall score for the application 1225. For example, the PHY layer 1205 predictions may be performed by a network interface card (NIC) that provides physical network access for a node, the MAC layer 1210 predictions may be performed by a switch that provides network connectivity to the node, and the network layer 1215 predictions may be provided by a router providing routing between segments of the network. In an example, the NIC, switch, and router may report operational data to an agent that uses the data to make a prediction, generate an AI model, detect an anomaly, etc. based on the operational data.

The processing engine 1220 uses a variety of weights and algorithms to customize scoring for each application because different lower layer errors may impact different applications in different ways. Furthermore, new applications emerge for which different lower layer anomaly detectors may be retrained. Joint training of the lower layer AI detectors along with the models of the processing engine 1220 may be used to generate a set of refined scoring models that take into consideration the various impacts of a fault on various aspects of the applications.

Figure 13:
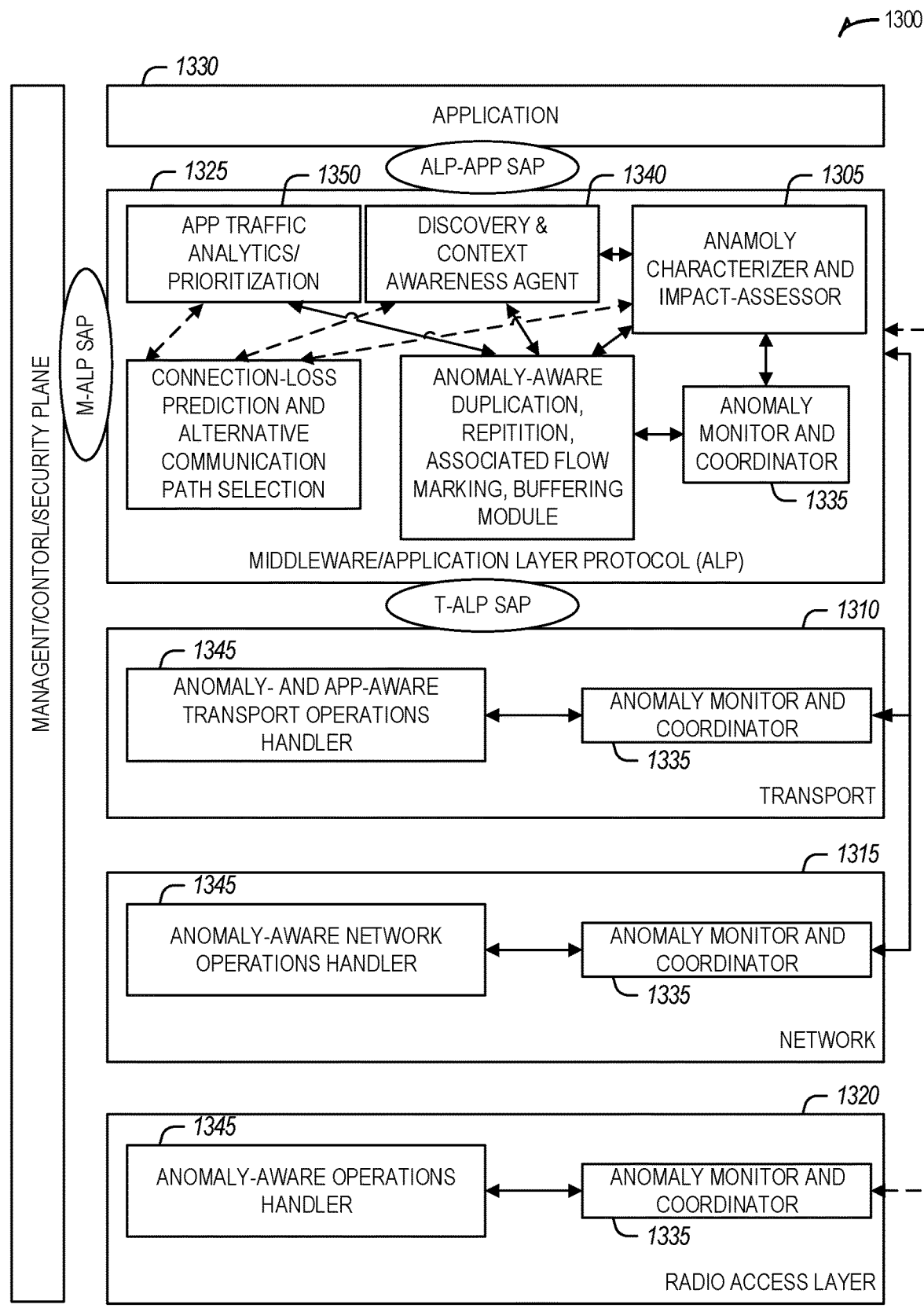
FIG. 13 illustrates an example of a multi-layer framework for anomaly processing for cross-layer automated fault tracking and anomaly detection, according to an embodiment.

FIG. 13 illustrates an example of a multi-layer framework 1300 for anomaly processing for cross-layer automated fault tracking and anomaly detection, according to an embodiment.

The multi-layer framework 1300 provides close coordination among multiple protocol layers. The multi-layer framework 1300 enables continuous/frequent monitoring/discovery of anomaly/fault at various layers by a discovery and context awareness agent 1340. The discovery and context awareness agent 1340 discovers and reports communication health of various links/paths/RATs/routes as well as other context (e.g., situation-aware information, etc.). Information from monitoring/discovery (e.g., anomaly detection or indications from various layers, etc.) may be continuously analyzed to characterize an anomaly, assess/correlate impact of an anomaly on one or more applications 1330, select proper actions to mitigate the impact of the anomaly, and execute the actions in a coordinated way at multiple layers of protocols such as a middleware layer 1325, transport layer 1310, a network layer 1315, and a radio access layer 1320. The selected actions may be application specific based on correlation of the anomaly to the application as decided by an anomaly characterizer and impact-assessor 1305. Interaction among the layers to share anomaly detection, negotiate/agree on collaborative actions among multiple network stack layers at same node (and across nodes such as source/destination of ongoing applications), etc. is handled by an anomaly monitor and coordinator 1335.

An instance of the anomaly monitor and coordinator 1335 may be present at each layer to share anomality indicators/detection and to negotiate/agree upon coordinated actions across layers. Radio access layer 1320 anomality indicators may include: (PHY/Lower MAC) anomalous signal/bit error rate (BER)/SNR pattern indicating unexpected link degradation; MAC/layer 2—Predicted potential handover, channel busy ratio (CBR) anomalies, expected trigger for resource access barring for specific categories of applications (e.g., low priority applications, etc.) due to unexpected increase in CBR, etc. Similarly, network layer 1315 and transport layer 1310 anomalies may include anomalous increase in routing latency, network congestion, unreachable destinations, etc. Anomaly indicators from the multiple layers may be utilized by the anomaly characterizer and impact-assessor 1305 to characterize an anomaly, enhance confidence levels for anomaly detection, correlate with specific applications as well as potential actions to deal with anomaly for impacted applications at various layers.

The selected/recommended actions may be sent back to associated layers as an assistance information to tackle anomaly in a coordinated way and in an application specific way. An anomaly-aware operations handler 1345 may be present at various layers to ensure realization of selected actions to handle an anomaly. The middleware 1325 may include additional components as shown in FIG. 13 to assist with altering operation of various network components to address an anomaly. The anomaly monitor and coordinator 1335 handles Intra-Node Inter-Layer coordination as well as Inter-node Coordination. Additional components of the middleware 1325 may include an application traffic analyzer/prioritizer 1350 that may extract attributes of applications 1330 (e.g., QoS/QoE requirements, intent/goal/type of application packets, etc.) that may be combined with monitoring/discovery information to make effective decisions.

Figure 14:
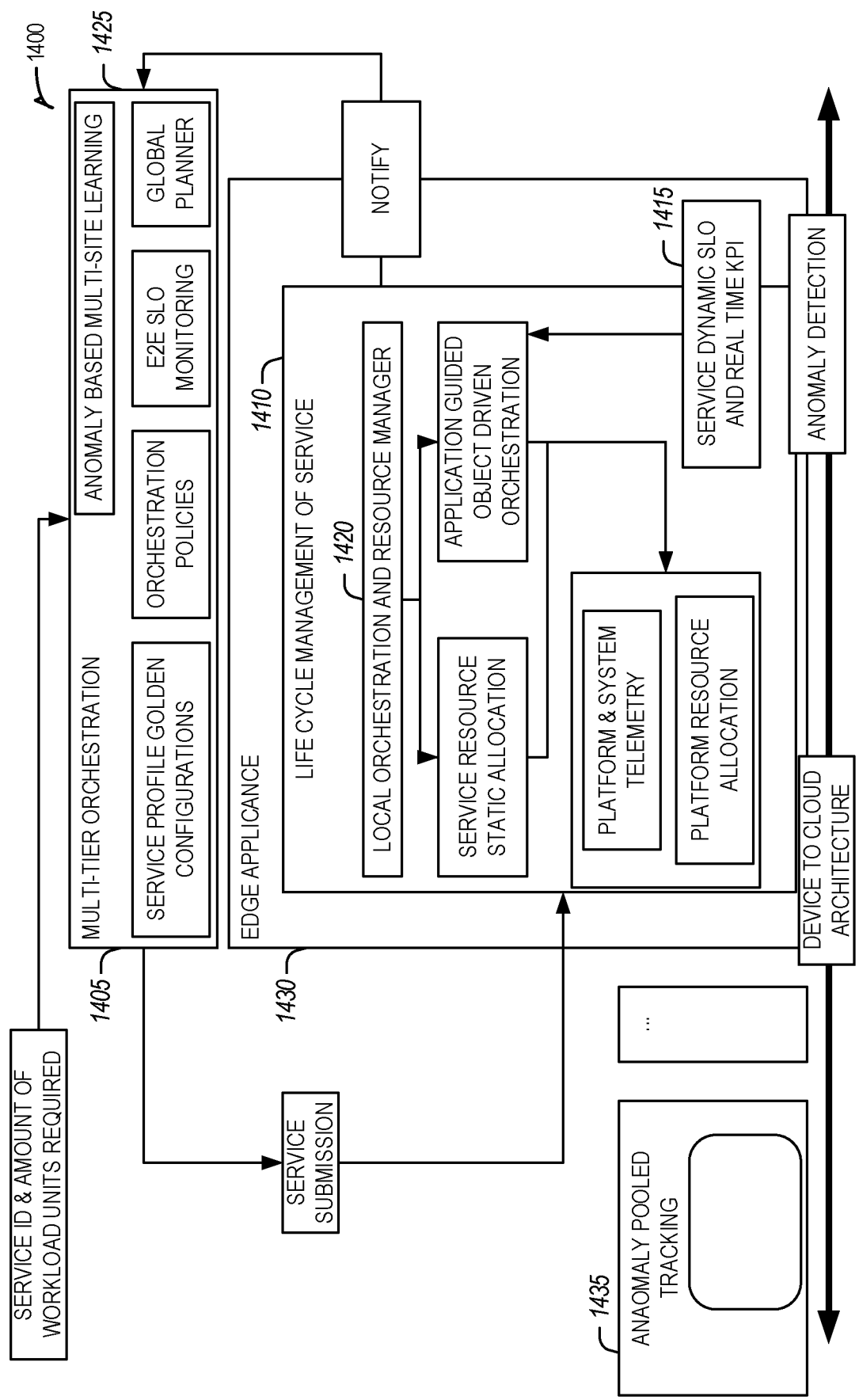
FIG. 14 illustrates an example of an architecture for anomaly processing for cross-layer automated fault tracking and anomaly detection, according to an embodiment.

FIG. 14 illustrates an example of an architecture 1400 for anomaly processing for cross-layer automated fault tracking and anomaly detection, according to an embodiment. Anomaly detections are brought into an orchestration layer 1405 of the network upon discovery. Thus, current orchestration life cycle management 1410 of the application is expanded to consider the anomalies detected from lower layers. For example, current network architecture includes an area for a potential expansion in a multi-tiered and multi-edge deployment.

Services/applications may provide service-level objectives (SLOs) for the application key performance indicators (KPIs) as well as Anomaly related KPIs (e.g., how many milliseconds of disconnection can be supported) 1415. Services provide anomaly related KPIs in real-time to a local orchestrator and planner 1420. The local orchestrator and planner 1420 tracks application KPIs and anomalies. Anomalies may be reported into the local orchestrator and planner 1420 when application anomaly related KPIs are not satisfied. Anomaly detection running on an edge appliance 1430 may store tracing information and anomaly related meta-data for a particular service in a pooled tracing entity 1435 (e.g., implemented using pooled storage, etc.). Orchestration may use some historical data for services and anomalies experienced in the past in different edge locations to decide to move the services into other locations to address loss of service.

Figure 15:
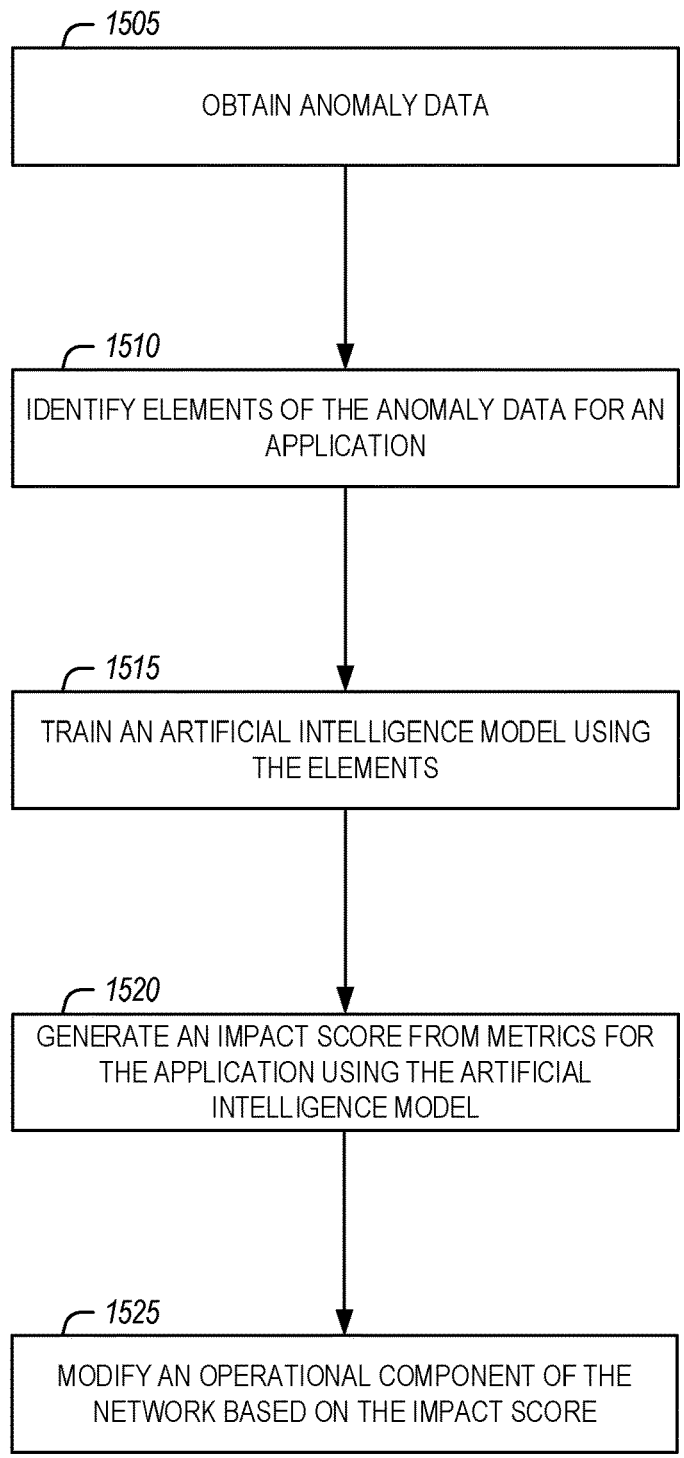
FIG. 15 illustrates a flow diagram of an example of a method for cross-layer automated fault tracking and anomaly detection, according to an embodiment.

FIG. 15 illustrates a flow diagram of an example of a method 1500 for cross-layer automated fault tracking and anomaly detection, according to an embodiment. The method 1500 may provide features as described in FIGS. 8-14.

At operation 1505, anomaly data may be obtained (e.g., via means including a logic gate of a processor, network communication circuitry, etc.) from a plurality of layers of a network. In an example, the plurality of layers may include at last one of a physical layer, a data link layer, a network layer, a transport layer, a session layer, a presentation layer, or a radio access technology layer. In an example, the anomaly data may be obtained from one or more data collectors operating in the plurality of layers. In an example, the network may an edge computing network and the anomaly data may be obtained from a base station node of the edge computing network. In an example, an anomaly associated with the anomaly data may be a radio access transmission error. In an example the anomaly data may be obtained from monitoring of payload integrity errors (e.g., checksum errors, etc.), packet delivery delays, round trip time (RTT) measurements, etc. in an overlay network for an anomaly that may occur in an underlay network through which the overlay network traffic is tunneled. In an example when monitoring of traffic in the overlay network is used for diagnosis of anomalies in an underlay network, security filtering may admit or exclude anomaly data providers in the overlay network so that anomaly data from only trusted overlay networks is used in identification of anomalies in the underlay network or in the diagnoses of anomalies in the underlay network.

At operation 1510, elements of the anomaly data may be identified (e.g., via means including an arithmetic and logic unit of a processor, data evaluation circuitry, etc.) that correspond to an application executing on the network. In an example, the anomaly data may include a data flow. An endpoint of the application a source of the application may be determined, and the elements may be identified as portions of the data flow flowing between the endpoint and the source.

At operation 1515, an artificial intelligence model may be trained (e.g., via means including an arithmetic and logic unit of a processor, machine learning processing circuitry, etc.) using the elements of the anomaly data to generate an impact score for the application. In an example, the anomaly data may include anomaly predictions for each layer of the plurality of layers. Weights may be applied to the anomaly predictions from the plurality of layers and the artificial intelligence model may be generated using the weighted anomaly predictions.

At operation 1520, the impact score may be generated (e.g., via means including an arithmetic and logic unit of a processor, algorithmic computing circuitry, etc.) for the application by evaluating current network metrics using the artificial intelligence model. In an example, the impact score may represent a relative impact of the anomaly on the application compared to an impact of the anomaly on other applications. In an example, the artificial intelligence model may be a graph model. The graph model may be generated to include nodes and edges that connect the nodes and the impact score may generated by traversing the edges and nodes of the graph model to calculate the impact score. In an example, current data flows of the application may be identified. A data flow of the current data flows may be selected based on the anomaly data and the current network metrics may be obtained from components of the network associated with the data flow.

At operation 1525, an operational component of the network may be modified (e.g., via means including a control unit of a processor, network communication circuitry, etc.) based on the impact score. In an example, a network path of the application may be altered. In another example, a resource assignment for the application may be altered on a node of the network. In an example, the impact score may be transmitted to an orchestration layer of the network. A remediation directive may be received from an orchestrator of the orchestration layer and the operational component may be modified based at least in part on the remediation directive.

It may be understood that the means for executing the method 1500 may be a single processor including one or more logic gates, control units, arithmetic and logic units, etc. or portions of the method 1500 may be distributed for execution among a plurality of processors using various components of the plurality of processors. Likewise, the network communication circuitry, machine learning processing circuitry, algorithmic computing circuitry, data evaluation circuitry, etc. may be included in a single computing device or may be distributed among a plurality of computing devices executing on a computing network.

ADDITIONAL NOTES & EXAMPLES

Example 1 is a system for multi-layer anomaly detection and reporting comprising: at least one processor; and memory including instructions that, when executed by the at least one processor, cause the at least one processor to perform operations to: obtain anomaly data from a plurality of layers of a network; identify elements of the anomaly data for flows that correspond to an application executing on the network; train an artificial intelligence model using the elements of the anomaly data to generate an impact score for the application; generate the impact score for the application by evaluating current network metrics using the artificial intelligence model; and modify an operational component of the network based on the impact score.

In Example 2, the subject matter of Example 1 wherein, the plurality of layers includes at last one of a physical layer, a data link layer, a network layer, a transport layer, a session layer, a presentation layer, or a radio access technology layer.

In Example 3, the subject matter of Examples 1-2 wherein, the anomaly data is obtained from one or more data collectors operating in the plurality of layers.

In Example 4, the subject matter of Examples 1-3 wherein, the anomaly data includes a data flow and the instructions to identify the elements further comprises instructions to: determine an endpoint of the data flow of the application; determine a source of the data flow of the application; and identify the elements as portions of the data flow flowing between the endpoint and the source.

In Example 5, the subject matter of Examples 1-4 wherein, the artificial intelligence model is a graph model and the instructions to train the artificial intelligence model includes instructions to generate the graph model including nodes and edges that connect the nodes, wherein the instructions to generate the impact score include instructions to traverse the edges and nodes of the graph model to calculate the impact score.

In Example 6, the subject matter of Examples 1-5 wherein, the impact score represents a relative impact of the anomaly on the application compared to an impact of the anomaly on other applications.

In Example 7, the subject matter of Examples 1-6 wherein, the instructions to modify the operational component includes instructions to alter a network path of the application.

In Example 8, the subject matter of Examples 1-7 wherein, the instructions to modify the operational component includes instructions to alter a resource assignment for the application on a node of the network.

In Example 9, the subject matter of Examples 1-8 wherein, the anomaly data includes anomaly predictions for each layer of the plurality of layers, and wherein the instructions to train the artificial intelligence model further comprises instructions to: apply weights to the anomaly predictions from the plurality of layers; and generate the artificial intelligence model using the weighted anomaly predictions.

In Example 10, the subject matter of Examples 1-9 wherein, the network is an edge computing network and wherein the instructions to obtain the anomaly data includes instructions to obtain the anomaly data from a base station node of the edge computing network.

In Example 11, the subject matter of Examples 1-10 wherein, an anomaly associated with the anomaly data is a radio access transmission error.

In Example 12, the subject matter of Examples 1-11 includes, the memory further comprising instructions that, when executed by the at least one processor, cause the at least one processor to perform operations to: identify current data flows of the application; select a data flow of the current data flows based on the anomaly data; and obtain the current network metrics from components of the network associated with the data flow.

In Example 13, the subject matter of Examples 1-12 includes, the memory further comprising instructions that, when executed by the at least one processor, cause the at least one processor to perform operations to: transmit the impact score to an orchestration layer of the network; receive a remediation directive from an orchestrator of the orchestration layer; and modify the operational component based at least in part on the remediation directive.

Example 14 is at least one machine-readable medium including instructions for multi-layer anomaly detection and reporting that, when executed by at least one processor, cause the at least one processor to perform operations to: obtain anomaly data from a plurality of layers of a network; identify elements of the anomaly data for flows that correspond to an application executing on the network; train an artificial intelligence model using the elements of the anomaly data to generate an impact score for the application; generate the impact score for the application by evaluating current network metrics using the artificial intelligence model; and modify an operational component of the network based on the impact score.

In Example 15, the subject matter of Example 14 wherein, the plurality of layers includes at last one of a physical layer, a data link layer, a network layer, a transport layer, a session layer, a presentation layer, or a radio access technology layer.

In Example 16, the subject matter of Examples 14-15 wherein, the anomaly data is obtained from one or more data collectors operating in the plurality of layers.

In Example 17, the subject matter of Examples 14-16 wherein, the anomaly data includes a data flow and the instructions to identify the elements further comprises instructions to: determine an endpoint of the data flow of the application; determine a source of the data flow of the application; and identify the elements as portions of the data flow flowing between the endpoint and the source.

In Example 18, the subject matter of Examples 14-17 wherein, the artificial intelligence model is a graph model and the instructions to train the artificial intelligence model includes instructions to generate the graph model including nodes and edges that connect the nodes, wherein the instructions to generate the impact score include instructions to traverse the edges and nodes of the graph model to calculate the impact score.

In Example 19, the subject matter of Examples 14-18 wherein, the impact score represents a relative impact of the anomaly on the application compared to an impact of the anomaly on other applications.

In Example 20, the subject matter of Examples 14-19 wherein, the instructions to modify the operational component includes instructions to alter a network path of the application.

In Example 21, the subject matter of Examples 14-20 wherein, the instructions to modify the operational component includes instructions to alter a resource assignment for the application on a node of the network.

In Example 22, the subject matter of Examples 14-21 wherein, the anomaly data includes anomaly predictions for each layer of the plurality of layers, and wherein the instructions to train the artificial intelligence model further comprises instructions to: apply weights to the anomaly predictions from the plurality of layers; and generate the artificial intelligence model using the weighted anomaly predictions.

In Example 23, the subject matter of Examples 14-22 wherein, the network is an edge computing network and wherein the instructions to obtain the anomaly data includes instructions to obtain the anomaly data from a base station node of the edge computing network.

In Example 24, the subject matter of Examples 14-23 wherein, an anomaly associated with the anomaly data is a radio access transmission error.

In Example 25, the subject matter of Examples 14-24 includes, instructions that, when executed by the at least one processor, cause the at least one processor to perform operations to: identify current data flows of the application; select a data flow of the current data flows based on the anomaly data; and obtain the current network metrics from components of the network associated with the data flow.

In Example 26, the subject matter of Examples 14-25 includes, instructions that, when executed by the at least one processor, cause the at least one processor to perform operations to: transmit the impact score to an orchestration layer of the network; receive a remediation directive from an orchestrator of the orchestration layer; and modify the operational component based at least in part on the remediation directive.

Example 27 is a method for multi-layer anomaly detection and reporting comprising: obtaining anomaly data from a plurality of layers of a network; identifying elements of the anomaly data for flows that correspond to an application executing on the network; training an artificial intelligence model using the elements of the anomaly data to generate an impact score for the application; generating the impact score for the application by evaluating current network metrics using the artificial intelligence model; and modifying an operational component of the network based on the impact score.

In Example 28, the subject matter of Example 27 wherein, the plurality of layers includes at last one of a physical layer, a data link layer, a network layer, a transport layer, a session layer, a presentation layer, or a radio access technology layer.

In Example 29, the subject matter of Examples 27-28 wherein, the anomaly data is obtained from one or more data collectors operating in the plurality of layers.

In Example 30, the subject matter of Examples 27-29 wherein, the anomaly data includes a data flow and identifying the elements further comprises: determining an endpoint of the data flow of the application; determining a source of the data flow of the application; and identifying the elements as portions of the data flow flowing between the endpoint and the source.

In Example 31, the subject matter of Examples 27-30 wherein, the artificial intelligence model is a graph model and training the artificial intelligence model includes generating the graph model including nodes and edges that connect the nodes, wherein the impact score is generated by traversing the edges and nodes of the graph model to calculate the impact score.

In Example 32, the subject matter of Examples 27-31 wherein, the impact score represents a relative impact of the anomaly on the application compared to an impact of the anomaly on other applications.

In Example 33, the subject matter of Examples 27-32 wherein, modifying the operational component includes altering a network path of the application.

In Example 34, the subject matter of Examples 27-33 wherein, modifying the operational component includes altering a resource assignment for the application on a node of the network.

In Example 35, the subject matter of Examples 27-34 wherein, the anomaly data includes anomaly predictions for each layer of the plurality of layers, and wherein training the artificial intelligence model further comprises: applying weights to the anomaly predictions from the plurality of layers; and generating the artificial intelligence model using the weighted anomaly predictions.

In Example 36, the subject matter of Examples 27-35 wherein, the network is an edge computing network and wherein the anomaly data is obtained from a base station node of the edge computing network.

In Example 37, the subject matter of Examples 27-36 wherein, an anomaly associated with the anomaly data is a radio access transmission error.

In Example 38, the subject matter of Examples 27-37 includes, identifying current data flows of the application; selecting a data flow of the current data flows based on the anomaly data; and obtaining the current network metrics from components of the network associated with the data flow.

In Example 39, the subject matter of Examples 27-38 includes, transmitting the impact score to an orchestration layer of the network; receiving a remediation directive from an orchestrator of the orchestration layer; and modifying the operational component based at least in part on the remediation directive.

Example 40 is at least one machine-readable medium including instructions that, when executed by a machine, cause the machine to perform any method of Examples 27-39.

Example 41 is a system comprising means to perform any method of Examples 27-39.

Example 42 is a system for multi-layer anomaly detection and reporting comprising: means for obtaining anomaly data from a plurality of layers of a network; means for identifying elements of the anomaly data for flows that correspond to an application executing on the network; means for training an artificial intelligence model using the elements of the anomaly data to generate an impact score for the application; means for generating the impact score for the application by evaluating current network metrics using the artificial intelligence model; and means for modifying an operational component of the network based on the impact score.

In Example 43, the subject matter of Example 42 wherein, the plurality of layers includes at last one of a physical layer, a data link layer, a network layer, a transport layer, a session layer, a presentation layer, or a radio access technology layer.

In Example 44, the subject matter of Examples 42-43 wherein, the anomaly data is obtained from one or more data collectors operating in the plurality of layers.

In Example 45, the subject matter of Examples 42-44 wherein, the anomaly data includes a data flow and the means for identifying the elements further comprises: means for determining an endpoint of the data flow of the application; means for determining a source of the data flow of the application; and means for identifying the elements as portions of the data flow flowing between the endpoint and the source.

In Example 46, the subject matter of Examples 42-45 wherein, the artificial intelligence model is a graph model and the means for training the artificial intelligence model includes means for generating the graph model including nodes and edges that connect the nodes, wherein the means for generating the impact score includes means for traversing the edges and nodes of the graph model to calculate the impact score.

In Example 47, the subject matter of Examples 42-46 wherein, the impact score represents a relative impact of the anomaly on the application compared to an impact of the anomaly on other applications.

In Example 48, the subject matter of Examples 42-47 wherein, the means for modifying the operational component includes means for altering a network path of the application.

In Example 49, the subject matter of Examples 42-48 wherein, the means for modifying the operational component includes means for altering a resource assignment for the application on a node of the network.

In Example 50, the subject matter of Examples 42-49 wherein, the anomaly data includes anomaly predictions for each layer of the plurality of layers, and wherein the means for training the artificial intelligence model further comprises: means for applying weights to the anomaly predictions from the plurality of layers; and means for generating the artificial intelligence model using the weighted anomaly predictions.

In Example 51, the subject matter of Examples 42-50 wherein, the network is an edge computing network and wherein the means for obtaining the anomaly data includes means for obtaining the anomaly data from a base station node of the edge computing network.

In Example 52, the subject matter of Examples 42-51 wherein, an anomaly associated with the anomaly data is a radio access transmission error.

In Example 53, the subject matter of Examples 42-52 includes, means for identifying current data flows of the application; means for selecting a data flow of the current data flows based on the anomaly data; and means for obtaining the current network metrics from components of the network associated with the data flow.

In Example 54, the subject matter of Examples 42-53 includes, means for transmitting the impact score to an orchestration layer of the network; means for receiving a remediation directive from an orchestrator of the orchestration layer; and means for modifying the operational component based at least in part on the remediation directive.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

Example 59 is an edge computing system, comprising a plurality of edge computing nodes, the plurality of edge computing nodes configured with the biometric security methods of any of the examples of 1-54.

Example 60 is an edge computing node, operable in an edge computing system, comprising processing circuitry configured to implement any of the examples of 1-54.

Example 61 is an edge computing node, operable as a server in an edge computing system, configured to perform any of the examples of 1-54.

Example 62 is an edge computing node, operable as a client in an edge computing system, configured to perform any of the examples of 1-54.

Example 63 is an edge computing node, operable in a layer of an edge computing network as an aggregation node, network hub node, gateway node, or core data processing node, configured to perform any of the examples of 1-54.

Example 64 is an edge computing network, comprising networking and processing components configured to provide or operate a communications network, to enable an edge computing system to implement any of the examples of 1-54.

Example 65 is at least one machine-readable medium including instructions that, when executed by processing circuitry, cause the processing circuitry to perform operations to implement of any of Examples 1-54.

Example 66 is an apparatus comprising means to implement of any of Examples 1-54.

Example 67 is a system to implement of any of Examples 1-54.

Example 68 is a method to implement of any of Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for multi-layer anomaly detection and reporting comprising:
at least one processor; and
memory including instructions that, when executed by the at least one processor, cause the at least one processor to perform operations to:
obtain anomaly data from a plurality of layers of a network, wherein the anomaly data includes anomaly predictions for each layer of the plurality of layers;
identify elements of the anomaly data for flows that correspond to an application executing on the network;
train an artificial intelligence model using the elements of the anomaly data to generate an impact score for the application, wherein weights are applied to the anomaly predictions from the plurality of layers, and wherein the artificial intelligence model is generated using the weighted anomaly predictions;
generate the impact score for the application by evaluating current network metrics using the artificial intelligence model; and
modify an operational component of the network based on the impact score.

2. The system of claim 1, wherein the plurality of layers includes at last one of a physical layer, a data link layer, a network layer, a transport layer, a session layer, a presentation layer, or a radio access technology layer.

3. The system of claim 1, wherein the anomaly data is obtained from one or more data collectors operating in the plurality of layers.

4. The system of claim 1, wherein the anomaly data includes a data flow and the instructions to identify the elements further comprises instructions to:
determine an endpoint of the data flow of the application;
determine a source of the data flow of the application; and
identify the elements as portions of the data flow flowing between the endpoint and the source.

5. The system of claim 1, wherein the artificial intelligence model is a graph model and the instructions to train the artificial intelligence model includes instructions to generate the graph model including nodes and edges that connect the nodes, wherein the instructions to generate the impact score include instructions to traverse the edges and nodes of the graph model to calculate the impact score.

6. The system of claim 1, wherein the instructions to modify the operational component includes instructions to alter a network path of the application.

7. The system of claim 1, wherein the instructions to modify the operational component includes instructions to alter a resource assignment for the application on a node of the network.

8. The system of claim 1, the memory further comprising instructions that, when executed by the at least one processor, cause the at least one processor to perform operations to:
identify current data flows of the application;
select a data flow of the current data flows based on the anomaly data; and
obtain the current network metrics from components of the network associated with the data flow.

9. The system of claim 1, the memory further comprising instructions that, when executed by the at least one processor, cause the at least one processor to perform operations to:
transmit the impact score to an orchestration layer of the network;
receive a remediation directive from an orchestrator of the orchestration layer; and
modify the operational component based at least in part on the remediation directive.

10. At least one non-transitory machine-readable medium including instructions for multi-layer anomaly detection and reporting that, when executed by at least one processor, cause the at least one processor to perform operations to:
obtain anomaly data from a plurality of layers of a network, wherein the anomaly data includes anomaly predictions for each layer of the plurality of layers;
identify elements of the anomaly data for flows that correspond to an application executing on the network;
train an artificial intelligence model using the elements of the anomaly data to generate an impact score for the application, wherein weights are applied to the anomaly predictions from the plurality of layers, and wherein the artificial intelligence model is generated using the weighted anomaly predictions;

generate the impact score for the application by evaluating current network metrics using the artificial intelligence model; and modify an operational component of the network based on the impact score.

11. The at least one machine-readable medium of claim 10, wherein the anomaly data includes a data flow and the instructions to identify the elements further comprises instructions to:

determine an endpoint of the data flow of the application;
determine a source of the data flow of the application; and
identify the elements as portions of the data flow flowing between the endpoint and the source.

12. The at least one machine-readable medium of claim 10, wherein the impact score represents a relative impact of the anomaly on the application compared to an impact of the anomaly on other applications.

13. The at least one machine-readable medium of claim 10, wherein an anomaly associated with the anomaly data is a radio access transmission error.

14. The at least one machine-readable medium of claim 10, further comprising instructions that, when executed by the at least one processor, cause the at least one processor to perform operations to:

identify current data flows of the application;
select a data flow of the current data flows based on the anomaly data; and
obtain the current network metrics from components of the network associated with the data flow.

15. The at least one machine-readable medium of claim 10, further comprising instructions that, when executed by the at least one processor, cause the at least one processor to perform operations to:

transmit the impact score to an orchestration layer of the network;
receive a remediation directive from an orchestrator of the orchestration layer; and
modify the operational component based at least in part on the remediation directive.

16. The at least one machine-readable medium of claim 10, wherein the plurality of layers includes at last one of a physical layer, a data link layer, a network layer, a transport layer, a session layer, a presentation layer, or a radio access technology layer.

17. A method for multi-layer anomaly detection and reporting comprising:

obtaining anomaly data from a plurality of layers of a network, wherein the anomaly data includes anomaly predictions for each layer of the plurality of layers;

identifying elements of the anomaly data for flows that correspond to an application executing on the network;

training an artificial intelligence model using the elements of the anomaly data to generate an impact score for the application, wherein weights are applied to the anomaly predictions from the plurality of layers, and wherein the artificial intelligence model is generated using the weighted anomaly predictions;

generating the impact score for the application by evaluating current network metrics using the artificial intelligence model; and modifying an operational component of the network based on the impact score.

18. The method of claim 17, wherein the anomaly data includes a data flow and identifying the elements further comprises:

determining an endpoint of the data flow of the application;
determining a source of the data flow of the application; and
identifying the elements as portions of the data flow flowing between the endpoint and the source.

19. The method of claim 17, wherein modifying the operational component includes altering a network path of the application.

20. The method of claim 17, wherein modifying the operational component includes altering a resource assignment for the application on a node of the network.

21. The method of claim 17, further comprising:
identifying current data flows of the application;
selecting a data flow of the current data flows based on the anomaly data; and
obtaining the current network metrics from components of the network associated with the data flow.

22. The method of claim 17, further comprising:
transmitting the impact score to an orchestration layer of the network;
receiving a remediation directive from an orchestrator of the orchestration layer; and
modifying the operational component based at least in part on the remediation directive.

23. The method of claim 17, wherein the plurality of layers includes at last one of a physical layer, a data link layer, a network layer, a transport layer, a session layer, a presentation layer, or a radio access technology layer.

24. The method of claim 23, wherein the anomaly data is obtained from one or more data collectors operating in the plurality of layers.

* * * * *